(12) United States Patent
Mosier et al.

(10) Patent No.: US 6,714,186 B1
(45) Date of Patent: Mar. 30, 2004

(54) AVIONIC DISPLAY WITH TUNABLE FILTER

(75) Inventors: Donald E. Mosier, Cedar Rapids, IA (US); Ricky J. Johnson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 292 days.

(21) Appl. No.: 09/861,307

(22) Filed: May 18, 2001

(51) Int. Cl.[7] ................................................ G09G 3/36
(52) U.S. Cl. ...................... 345/104; 349/5; 250/214 VT
(58) Field of Search .............................. 349/61, 64, 112, 349/198, 5, 104; 362/26, 559, 231; 385/146, 11; 701/45; 313/483; 345/32, 104; 250/214 VT

(56) References Cited

U.S. PATENT DOCUMENTS

| | | | | |
|---|---|---|---|---|
| 5,211,463 A | * | 5/1993 | Kalmanash | 362/26 |
| 5,262,880 A | * | 11/1993 | Abileah | 349/64 |
| 5,321,539 A | * | 6/1994 | Hirabayashi et al. | 349/198 |
| 5,479,275 A | * | 12/1995 | Abileah | 349/5 |
| 5,629,784 A | * | 5/1997 | Abileah et al. | 349/112 |
| 6,023,550 A | * | 2/2000 | Benoit | 385/146 |
| 6,111,622 A | * | 8/2000 | Abileah | 349/61 |
| 6,324,453 B1 | * | 11/2001 | Breed et al. | 701/45 |
| 6,419,372 B1 | * | 7/2002 | Shaw et al. | 362/231 |
| 6,428,198 B1 | * | 8/2002 | Saccomanno et al. | 362/559 |
| 6,639,349 B1 | * | 10/2003 | Bahadur | 313/483 |
| 6,650,797 B2 | * | 11/2003 | Naganuma | 385/11 |

* cited by examiner

*Primary Examiner*—Steven Saras
*Assistant Examiner*—Srilakshmi Kumar
(74) *Attorney, Agent, or Firm*—Nathan O. Jensen; Kyle Eppele

(57) ABSTRACT

The display includes a light source and a filter positioned to receive light from the light source. The filter has a different wavelength characteristic depending upon an angle of incidence of light thereon. The angle of incidence is adjustable. The display can be utilized in an avionic display system with night vision equipment. The wavelength characteristic can be a cutoff wavelength characteristic.

20 Claims, 4 Drawing Sheets

AVIONIC DISPLAY WITH TUNABLE FILTER

FIELD OF THE INVENTION

The present specification relates generally to the field of displays. More particularly, the present specification relates to a method of and an apparatus for utilizing a tunable filter in a display.

BACKGROUND OF THE INVENTION

In general, it is desirous to utilize filters in display technology to attenuate or accentuate particular types of electromagnetic radiation. For example, certain displays and visual equipment may desire to accentuate particular colors in the visible light spectrum and attenuate other colors in the non-visible and the visible light spectrum. Accordingly, these display can utilize filters to provide accentuation and attenuation.

In one particular application, displays and other equipment utilized in military, sports and transportation activities are often employed in tandem with night vision equipment. These displays and equipment conventionally utilize a filter to accommodate the night vision equipment. Issues related to the use of displays and night vision equipment are described below with reference to an aviation application, although the below-mentioned issues are relevant to any applications of displays requiring attenuation or accentuation.

Certain aviation displays are color displays that are utilized with night vision imaging systems (NVIS). These displays provide visual information to captains, pilots, and drivers of ships, aircraft, and vehicles. The user of the color display often wears NVIS goggles at the same time he or she observes information from the color display.

Conventional NVIS goggles are sensitive to light in the infrared, near infrared and visible red spectrum (wavelengths of light). NVIS goggles are typically sensitive to light between 600 nm and 950 nm wavelengths. Although the NVIS goggles allow the pilot or person wearing the goggles to see objects which cannot ordinarily be seen by the naked eye, the goggles bloom (emit bright light) if cockpit lighting is too intense in the spectral region where the goggles are sensitive. The net result, which is highly undesirable, is a loss of contrast when the pilot is looking through the goggles.

Additionally, when the goggles emit the bright light, the pilot's eyes may lose their night adaptation (e.g., night vision). Restoring full night adaptation can take several minutes. Accordingly, the bloom effect is undesirable when operating a vehicle or aircraft in night vision conditions.

Conventional avionic displays designed to be utilized with NVIS equipment generally are restricted to a narrow emission, such as, single color (e.g., green) displays. The narrow emission is chosen so that it does not interfere with NVIS equipment. However, the restriction to the narrow emission significantly reduces the readability of information and the symbology provided on the displays. Further, it is difficult to highlight and differentiate large amounts of information on the display if the display is restricted to a single color.

Other conventional avionic systems have included color displays that include an NVIS filter. The color display operates in two modes, an NVIS mode (e.g., low luminance) and daylight mode. The NVIS filter is provided between a light source used in the NVIS mode and an optical shutter, such as a liquid crystal display. The filter prevents emissions that cause NVIS equipment to bloom.

In the daylight mode, the displays use a second light source to provide light directly through the optical shutter without traversing the filter. The second light source is positioned so that its light is not provided through the NVIS filter.

Conventional NVIS filters are generally comprised of glass or other material supplemented by thin film coatings that attenuate infrared emissions or transmissions. Conventional NVIS filters are generally relatively imprecise at its cutoff frequency. This characteristic is particularly problematic because the frequency at which NVIS goggles are sensitive is extremely close to the frequency at which red emissions exist. Accordingly, a precise cutoff frequency is needed in NVIS filters so that red colors can be effectively utilized on a display.

With reference to FIG. 1, the transmittance of a sample of filters is shown with respect to wavelength. As can be seen in FIG. 1, four different filters manufactured from the same material can have significantly different cutoff frequencies as represented by graphs 10, 12, 14 and 16. The difference in cutoff frequency is due to the tolerances associated with the manufacture of the materials and the deposition of the thin films associated with the NVIS filter. For example, variations in the thickness of the thin films cause variations in the cutoff frequency associated with the filter. If the filter has a cutoff wavelength that is too small, the filter attenuates visible color in the red range and the pilot is not able to view red colors on the display. If the cutoff wavelength is too large, the NVIS goggles receive emissions in the infrared and near infrared range and are susceptible to bloom effects. Manufacturing NVIS filters with tight tolerances is expensive and technologically challenging. Typically available NVIS filters have cutoff wavelengths varying from 600 to 640 nm.

Thus, there is a need for a display system that can utilize inexpensive NVIS filters. Further, there is a need for a display system which utilizes a tunable NVIS filter. Further still, there is a need for a system which can utilize a filter having a cutoff frequency within a large tolerance. Further still, there is a need for an avionic display which can utilize an inexpensive NVIS filter.

SUMMARY OF THE INVENTION

An exemplary embodiment relates to a display including a light source. The display includes a filter positioned to receive light from the light source. The filter has a different wavelength characteristic depending upon an angle of incidence of the light from the light source. The angle of incidence of the light is adjustable.

Yet another exemplary embodiment relates to an avionic display system. The avionic display system includes an optical shutter, a light guide, a first light source and a night vision filter. The night vision filter is positioned to receive light from the first light source. The filter has a different wavelength characteristic depending upon an angle of incidence of the light from the first light source. The angle of incidence of the light is adjustable. The light travels through the filter to the light guide to the optical shutter.

Yet another embodiment relates to a method of calibrating a filter for use in a display system. The display system includes a light source and the filter. The angle of incidence of light on the filter is adjustable. The filter has a cutoff characteristic varying according to the angle of incidence of light from the light source. The method includes measuring at least a portion of the spectrum of light provided through the filter, and adjusting the angle of incidence of light on the filter until a desired cutoff characteristic is achieved.

Yet still another exemplary embodiment relates to an avionic display system. The avionic display system also includes a means for providing a visual image, and a night vision filter means for attenuating light associated with the visual image above a selectable wavelength.

BRIEF DESCRIPTION OF THE DRAWINGS

Preferred exemplary embodiments are hereinafter described with reference to the accompanying drawings, wherein like numerals denote like elements, and.

DETAILED DESCRIPTION OF THE PREFERRED EMBODIMENTS

Figure 1:
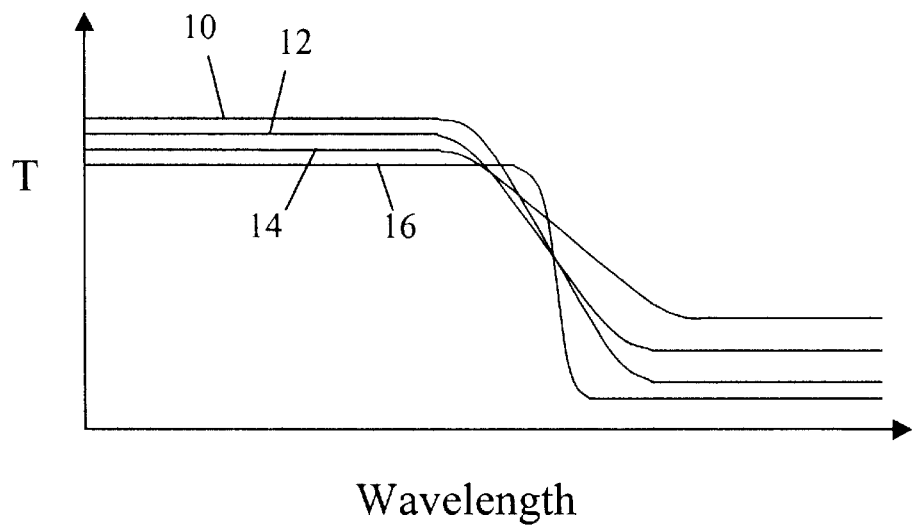
FIG. 1 is a drawing of an attenuation characteristic associated with a number of conventional filters.
Figure 2:
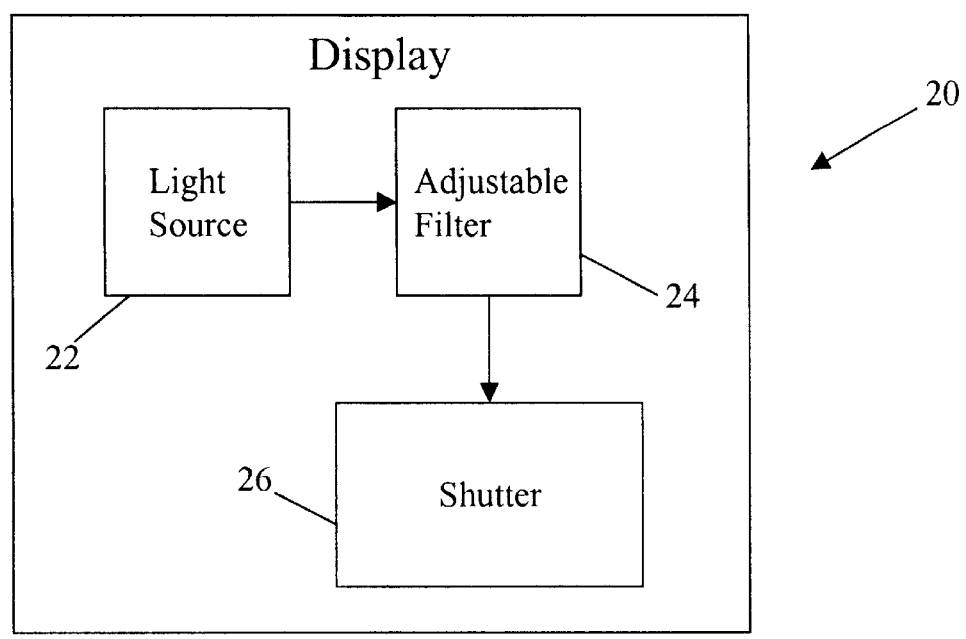
FIG. 2 is a schematic general block diagram of a display system including a filter, the display system is configured so that the adjustable cutoff characteristic of the filter is adjustable in accordance with an exemplary embodiment.

With reference to FIG. 2, an exemplary display system 20 includes a light source 22, an adjustable filter 24, and an optical shutter 26. Display system 20 can be utilized in any type of application involving the presentation of visual information. Display system 20 can be utilized in military, transportation, communication, or sporting applications where it is desirous to accentuate or attenuate electromagnetic radiation at particular frequencies. System 20 is configured so that the cutoff characteristic or frequency associated with filter 24 is adjustable. In a preferred embodiment, the frequency response of filter 24 can be adjusted by adjusting the angle of incidence of light to the filter.

Display system 20 can be an avionic display, such as a primary flight display, a radar display, or a targeting display. Display 20 can also be a display utilized in military applications, communication applications, or other visual systems where an adjustable filter is necessary.

Light source 22 can be any device for generating light, such as, an LED, an LED array, an incandescent light, a fluorescent light or other light generator for display system 20. Light source 22 can include dual light sources. Light source 22 can include super-bright LEDs. In one embodiment, light source 22 can be two or more light sources. The two or more light sources can be operable in various modes of operation.

Adjustable filter 24 can be any type of filter which is required to provide a cutoff characteristic at a particular wavelength. For example, filter 24 can provide filtering in any visible frequency range or in an infra-red frequency range. System 20 is preferably adjustable so that filter 24 has a particular cutoff characteristic. System 20 is adjustable at time of calibration, before or after manufacture, or by the operator to provide a particular cutoff frequency.

Filter 24 can provide accentuation or attenuation in various frequency ranges. Although a preferred embodiment is described with respect to an infra-red frequency range, any frequency range can be applicable to the principles described below. According to a preferred embodiment, filter 24 significantly attenuates radiation above a wavelength of about 600 nm and does not significantly attenuate radiation below a wavelength of about 600 nm. Alternatively, filter 24 can operate as a band pass filter having attenuation particular to a middle range. The type of filter utilized in system 20 is not described in a limiting fashion.

Shutter 26 can be any type of device for generating an image from light provided from light source 22 and adjustable filter 24. In one embodiment, shutter 26 can create variable images. Shutter 26 can be a passive liquid crystal display (LCD), an active matrix LCD, or any other device for creating images from a separate light source.

In another embodiment, light source 22 and shutter 26 can be replaced by a cathode ray tube (CRT), LED display, or other light source. In such an embodiment, filter 24 can be provided in front of the CRT, LED display, or other light source.

Figure 3:
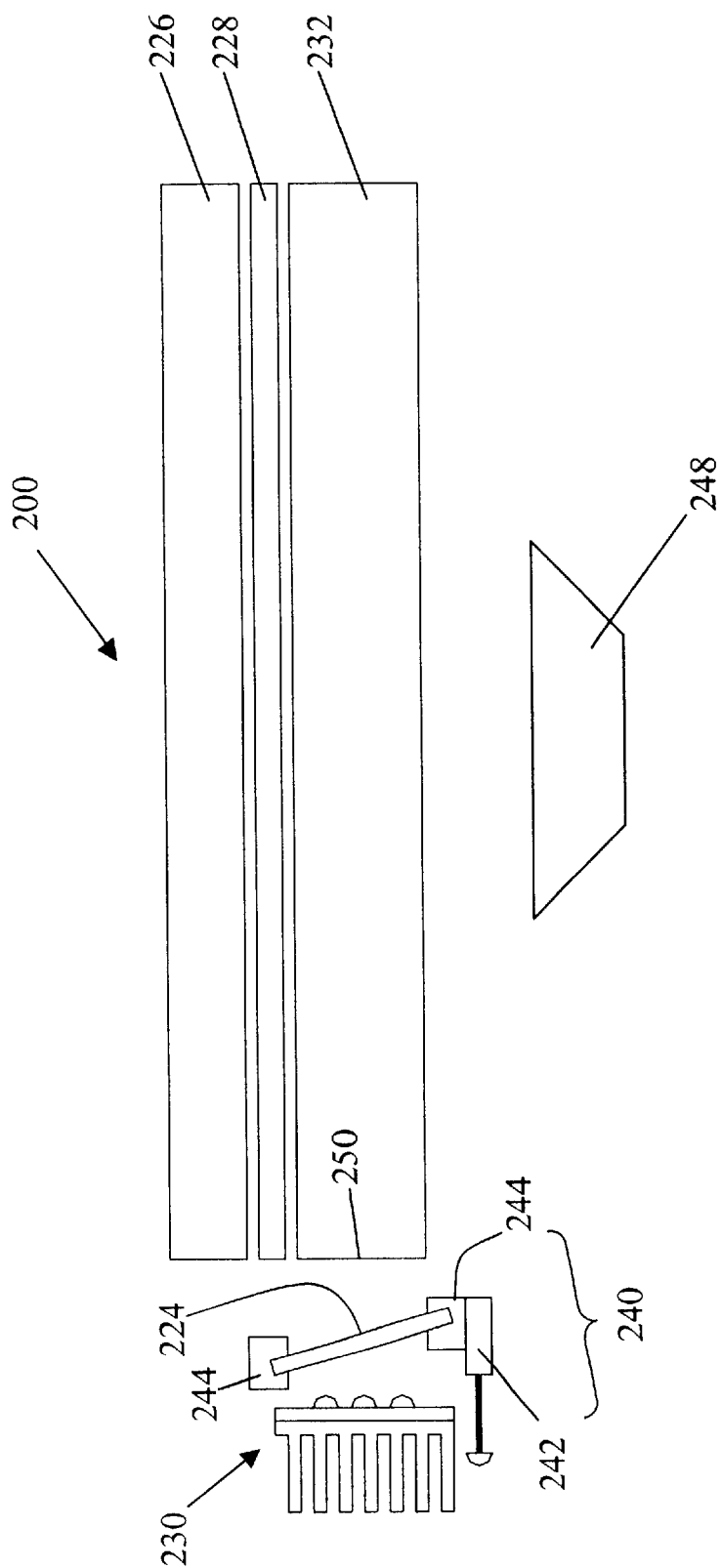
FIG. 3 is a schematic general block diagram of an avionic display including an NVIS filter, the avionic display is configured so that the cutoff characteristic of the filter is adjustable in accordance with another exemplary embodiment.

With reference to FIG. 3, a particular type of display system 20 (FIG. 2) is embodied as an avionic display system 200. Avionic display system 200 includes an optical shutter or liquid crystal display (LCD) 226, a diffuser 228, a light guide 232 and an adjustable filter 224. System 200 also includes a light source comprised of a night vision mode light source 230 and a non-night vision light source 248.

System 200 is preferably configured to be operated in a night vision mode (NVIS mode) and a non-night vision mode (daytime mode). Light is provided from light source 248 directly through light guide 232 and diffuser 228 to LCD 226 in a non-NVIS mode. In the NVIS mode, light is provided from light source 230 through filter 224 to light guide 232 through diffuser 228 to LCD 226.

Light sources 230 and 248 can be fluorescent tubes, or arrays of LEDs. Light source 230 can be a light emitting diode (LED) array requiring relatively fewer diodes because it is used at night or low light conditions. Sources 230 and 248 can include high brightness LEDs. Light source 248 is a brighter light source than source 230 for providing light through light guide 232 and diffuser 228 to LCD 226. Daytime modes generally require more light than night modes.

Filter 224 can be a night vision filter or NVIS filter. Filter 224 can be manufactured by ZC&R and by WamCo. Filter 224 is supported on an adjustment mechanism 240. Adjustment mechanism 240 can include a set screw 242, and a number of rubber blocks 244. Rubber blocks 244 could also be replaced with hinges, or any other device allowing the response of filter 224 to be adjusted.

Filter 224 can be a multilayer interference filter designed to provide a very steep roll-off or cutoff frequency with high transmission in the blue and green wavelengths and low or no transmission of longer infrared wavelengths. Advantageously, the manufacturing variability associated with filter 224 can be relatively high because system 200 allows the cutoff characteristic to be adjustable as described below. In this way, a low tolerance filter 224 can essentially be tuned to provide an appropriate cutoff characteristic for system 200. The tuning can occur during manufacture, during calibration, or during operation.

Various adjustment mechanisms can be utilized to change the position of filter 224. For example, a hinge, a deformable base, a ratchet mechanism, or other device can be utilized to position filter 224. Although a set screw 242 is shown, a motor or other adjustment mechanism can allow adjustments to be made. Adjustments can be made as display system 200 is operational. Adjustments can be made electronically.

Figure 4:
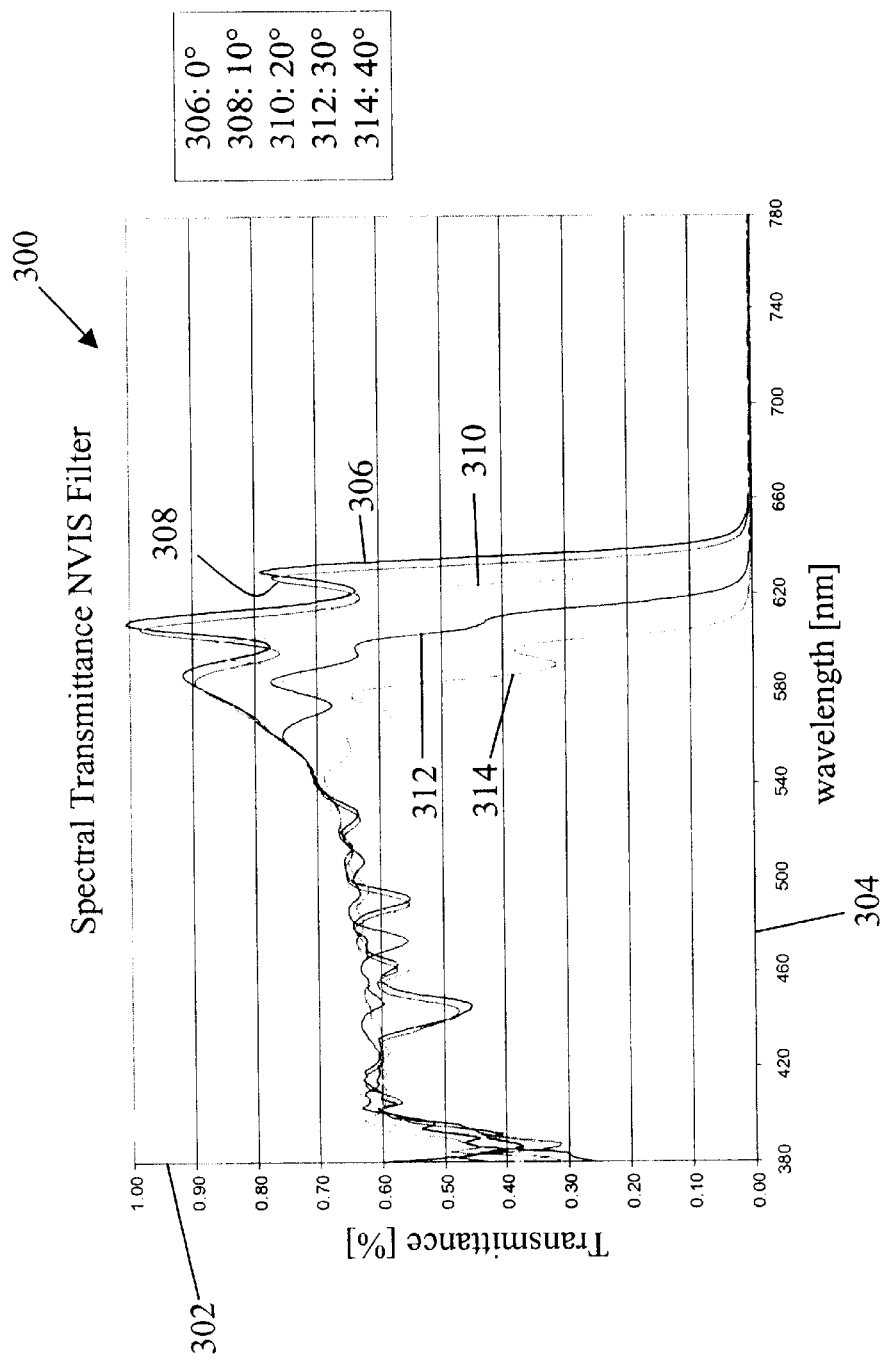
FIG. 4 is a graphic representation of cutoff characteristic of the adjustable filter illustrated in FIG. 2 at various angles of incidence of light.

With reference to FIG. 4, graph 300 shows a y-axis 302 indicating a percentage of transmittance and an x-axis 304 representing wavelength. As can be seen, each of lines 306, 308, 310, 312 and 314 represent the transmittance characteristic of filter 224 at angles of incidence of light of 0°, 10°, 20°, 30°, and 40°, respectively, with respect to the normals of filters 224. As shown, the cutoff wavelength is highest at a 0° incidence of light (line 306) and lowest at a 40° incidence light (line 314). The cutoff wavelength is the wavelength at which filter 224 transitions from a relatively high percentage of transmittance (e.g., 80%) to a relatively low percentage of transmittance (e.g., 20% or lower).

The incidence of light is adjusted by adjusting the orientation of filter 224 with respect to source 230. Preferably, filter 224 is hingeably rotated to adjust the angle of the incidence of light thereon. Alternatively, light source 230 could be rotated to adjust the incidence of light on filter 224. According to this alternative, light guide 232 can also be rotated to accommodate the change of direction of light from source 230 (e.g., light guide 232 is maintained in a fixed orientation with respect to source 230).

Filter 224 is preferably chosen so that its nominal value of cutoff frequency is at a slightly longer wavelength than the desired wavelength. In this way, the cutoff frequency can be reduced to the desired frequency by increasing the angle from the normal because the angle at the zero incidence is generally the highest cutoff frequency. In one such embodiment, filters having a nominal value for cutoff characteristic or frequency of about 650 nm is chosen.

During manufacture of system 200, system 200 can be calibrated by providing a spectrometer or other device for measuring the wavelength of light provided through LCD 226. The position of filter 224 can be adjusted until the appropriate or desired cutoff characteristic is achieved in the case of an avionic system for use with NVIS equipment. Filter 224 is preferably adjusted to provide a cutoff characteristic at approximately 630 nm wavelength.

In accordance with another exemplary embodiment, the incidence of light could be adjusted by utilizing mirrors, prisms, or other optical elements. Various light guides can be used to provide light to the elements at adjustable incidences. Although shown in FIG. 3 as being provided on a side 250 of light guide 232, system 200 can utilize a direct view (e.g., a large area of back light could be utilized). However, such a system would require additional space from the angular adjustment mechanism associated for such a large back light.

Figure 5:
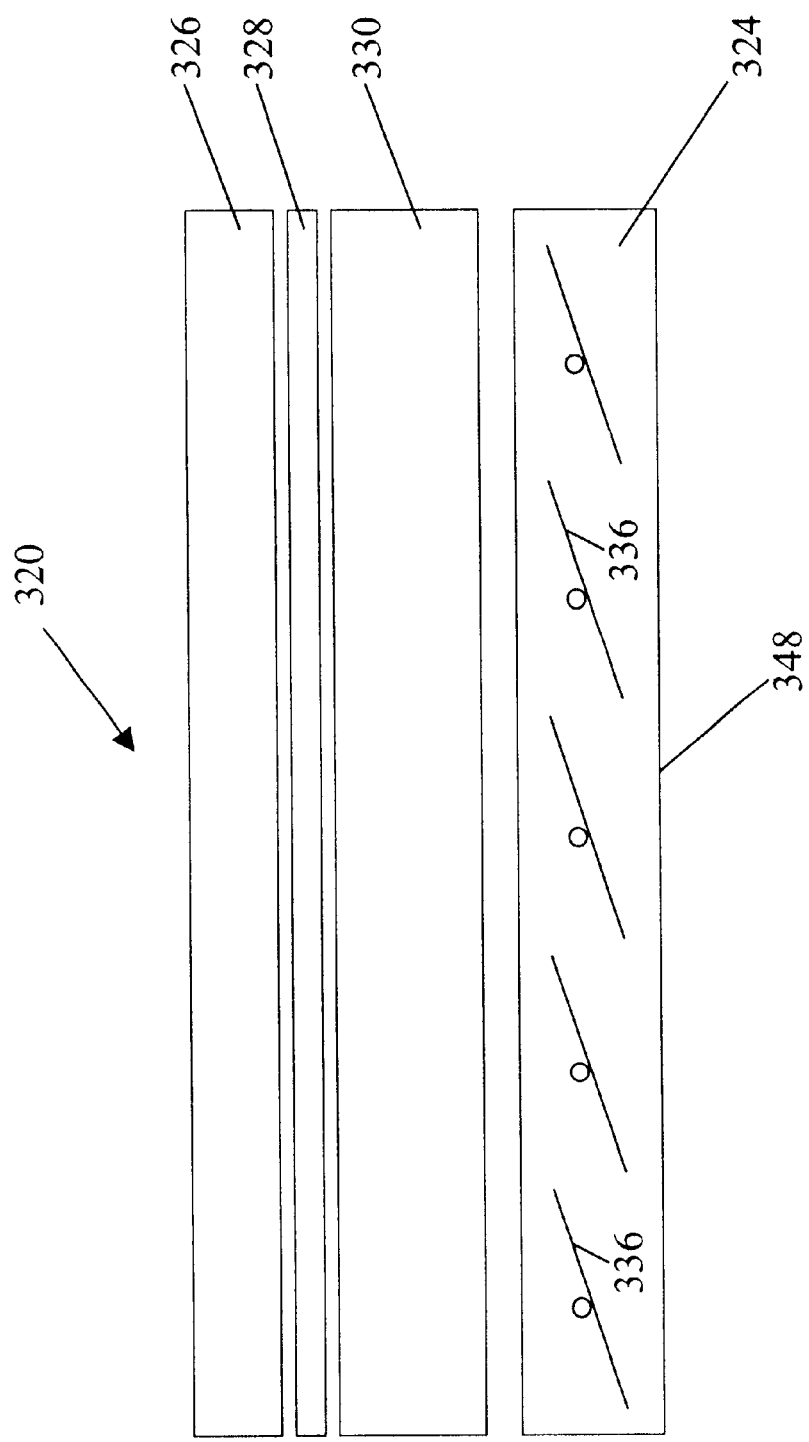
FIG. 5 is a schematic general block diagram of an avionic display including an NVIS filter, the avionic display is configured so that the cutoff characteristic of the filter is adjustable in accordance with yet another exemplary embodiment.

With reference to FIG. 5, a system 320 is similar to display system 20 discussed with reference to FIG. 2 and display system 200 discussed with reference to FIG. 3. Display system 320 can include a display 326, a diffuser 328 and a light guide 330. Light guide 330 can be similar to light guide 232 in FIG. 3, and diffuser 328 can be similar to diffuser 228 in FIG. 3. Display 326 can be similar to display 226 in FIG. 3.

System 320 advantageously includes a filter system 324 comprised of individual filter elements 336. Filter system 324 utilizes a Venetian blind type operation to adjust an angle of incidence of light through a surface 348 of system 324. A light source can provide light to surface 348 through filter elements 336 in an NVIS mode of operation.

Filter elements 336 can be NVIS filters. Alternatively, filter elements 336 can have different attenuation or accentuation ranges. In one embodiment, filter elements 336 can be oriented to 90 degree with respect to surface 348 so that filter elements 336 do not provide any attenuation or accentuation. With filter elements 336 normal to surface 348, a day-time or non-filtered mode of operation can be achieved for system 320.

With filter element 336 adjusted so that a proper incidence of light through surface 348 occurs thereon an appropriate cutoff characteristic can be achieved for filter system 324. The configuration of filter system 324 advantageously reduces the amount of space required between light guide 330 and the light source, would be required for a single large filter. Therefore, by adjusting the array of smaller filters, filter system 324 advantageously saves space for system 320.

Filter elements 336 can be mechanically mounted on a variety of pins, swivels, or hinges to achieve Venetian blind type operation. Alternatively, filter elements 336 can be individually adjusted.

According to one embodiment, certain portions of filter system 324 can have particular accentuation and attenuation. For example, red warning symbols may be provided on a periphery of display 326 and filter elements 336 associated with the periphery can be adjusted accordingly. Similarly, green symbology provided in the center of display 326 can require different filter characteristics for filter elements 336 associated with the center of display system 320.

It is understood that while preferred embodiments and specific examples are given, they are for the purpose of illustration only and are not limited to the precise details disclosed. For example, although specific wavelengths of light are discussed, other types of light can be utilized. Various cutoff characteristics can be achieved. Further, although avionic display systems are discussed, other display systems requiring adjustable filters can utilize the principles of the present invention. Various modifications may be made in the details within the scope and range of equivalents of the claims without departing from what is claimed.

What is claimed is:

1. A display including a light source, the display comprising:
   a filter positioned to receive light from the light source, wherein the filter has a different wavelength characteristic depending upon an angle of incidence of the light from the light source, whereby the angle of incidence of the light is adjustable.

2. The display of claim 1, wherein the filter is an NVIS filter and the wavelength characteristic attenuates light in the infrared range.

3. The display of claim 2, wherein the angle of incidence is adjusted so that a cutoff characteristic is at a wavelength of approximately 610 nm to 640 nm.

4. The display of claim 1 further comprising:
   a mechanically adjustable frame, the frame supporting the filter, whereby the frame adjusts a position of the filter to adjust the angle of incidence.

5. The display of claim 4, wherein the frame includes rubber mounting blocks.

6. The display of claim 1 further comprising:
a light guide positioned to receive the light provided through the filter.

7. An avionic display system comprising:
an optical shutter;
a light guide;
a first light source; and
a night vision filter positioned to receive light from the first light source, wherein the filter has a different wavelength characteristic depending upon an angle of incidence of the light from the first light source, whereby the angle of incidence of the light is adjustable, whereby the light travels through the filter to the light guide to the optical shutter.

8. The avionic display system of claim 7 further comprising:
a second light source, wherein the avionic display system provides the light from the first light source through the filter to the light guide to the optical shutter in a night vision mode and provides light from the second light source to the optical shutter in a second mode.

9. The avionic display system of claim 8, wherein a position of the night vision filter can be adjusted relative to the light from the first light source to adjust the angle of incidence of the light on the night vision filter.

10. The avionic display system of claim 9, wherein the night vision filter is an NVIS filter.

11. The avionic display system of claim 7, wherein the night vision filter is an array of filters.

12. The avionic display system of claim 11, wherein the array of filters are angularly adjustable to adjust the angle of incidence.

13. The avionic display system of claim 12, wherein the array of filters have a Venetian blind configuration.

14. A method of calibrating a filter for use in a display system, the display system including a light source and the filter, the angle of incidence of light on the filter being adjustable, wherein the filter has a cutoff characteristic varying according to the angle of incidence of light from the light source, the method comprising:
measuring at least a portion of the spectrum of light provided through the filter; and
adjusting the angle of incidence of the light on the filter until a desired cutoff characteristic is achieved.

15. The method of claim 14, wherein the adjusting utilizes a mechanical adjustable frame, the frame supporting the filter.

16. The method of claim 15, wherein the filter is an NVIS filter.

17. The method of claim 14, wherein the light source is a CRT or LCD.

18. The method of claim 17, wherein the filter includes a set of filter elements.

19. The method of claim 18, wherein the filter elements are disposed in a Venetian blind configuration.

20. The method of claim 14, wherein the filter is mounted on flexible blocks.

* * * * *